United States Patent
Popugaev et al.

(10) Patent No.: US 8,576,124 B2
(45) Date of Patent: Nov. 5, 2013

(54) RFID TRANSPONDER, IN PARTICULAR FOR ASSEMBLY ON METAL AND MANUFACTURING METHOD THEREFOR

(75) Inventors: Alexander Popugaev, Erlangen (DE); Ralner Wansch, Hagenau (DE); Josef Bernhard, Nabburg (DE); Alexander Pflaum, Erlangen (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 775 days.

(21) Appl. No.: 12/801,258

(22) Filed: May 28, 2010

(65) Prior Publication Data
US 2011/0025471 A1   Feb. 3, 2011

(30) Foreign Application Priority Data
May 29, 2009 (EP) .................... 09007225

(51) Int. Cl.
*H01Q 1/38* (2006.01)
*H01Q 7/00* (2006.01)

(52) U.S. Cl.
USPC ................ 343/700 MS; 343/748

(58) Field of Classification Search
USPC ........ 343/700 MS, 744, 748, 749; 340/572.1, 340/572.7
See application file for complete search history.

(56) References Cited

U.S. PATENT DOCUMENTS
7,342,498 B2 *   3/2008   Baba et al. ................. 340/572.5

FOREIGN PATENT DOCUMENTS
EP   1947733   7/2008
WO   2009004666   1/2009

* cited by examiner

*Primary Examiner* — Hoang V Nguyen
(74) *Attorney, Agent, or Firm* — Jacobson Holman PLLC (57) ABSTRACT

An RFID transponder including an antenna, a chip having at least one transmission and reception circuit as well as a memory, a dielectric carrier element which is covered on a first surface with a structured first metallization and which is covered on a second surface disposed opposite the first surface with a second metallization. The first and second metallizations are mutually electrically conductively connected, thereby forming the antenna. The first metallization is structured such that it forms two electric terminals of the antenna arranged on the first surface of the dielectric carrier element. The chip can be or is electrically contacted via these two terminals. An adaptation network is at least partly formed by the structuring of the first metallization and adapting the input impedance of the antenna in a conjugate complex manner to the impedance of the chip.

13 Claims, 6 Drawing Sheets

| RFID-Transponder | dimensions | operating distance [m] (865-868 MHz) |
|---|---|---|
| Fraunhofer-IIS | 37 x 7 x 3,3 | 4,5 |
| OMNI-ID-FLEX | 77 x 15 x 2,5 | 2,5 |
| Tagnology | 75 x 20 x 8 | 2,3 |
| TITAN 1B | 92 x 13 x 2,8 | 2,1 |
| TITAN | 38 x 10 x 3 | 1,1 |
| CONFIDEX | 58 x 28 x 1,3 | 0,9 |
| OMNI-ID-PROX | 35 x 10 x 4 | 0,8 |

FIG. 7

RFID TRANSPONDER, IN PARTICULAR FOR ASSEMBLY ON METAL AND MANUFACTURING METHOD THEREFOR

This application has a priority of European no. 09 007 225.7 filed May 29, 2009, hereby incorporated by reference.

FIELD OF THE INVENTION

The present invention relates to an RFID transponder and to a corresponding manufacturing method for an RFID transponder. The RFID transponder in accordance with the invention is in this respect in particular made so that it can be used in one of the UHF (ultra high frequency) bands 865-868 MHz (Europe), 902-928 MHz (Canada and the US) and 950-956 MHz (Japan).

BACKGROUND OF THE INVENTION

Currently, RFID systems are used very intensively and profitably in many areas, above all also in the logistics field. Very compact, flat RFID transponders (so-called tags) are required in many cases in this respect.

Most known concepts for such RFID transponder antennas (that is tag antennas) such as so-called PIFA antennas (printed inverted F antennas) are in this respect not completely planar. They are produced on a conductive adhesive film and folded in a plurality of layers. In addition, such a design is rather complex and expensive; furthermore, a corresponding structure is also difficult to modify (for example, when another chip should be used or when the tag should be adapted to a different frequency range). Since such a design is also not easy to reproduce, such RFID transponders frequently have only low ranges.

SUMMARY OF THE INVENTION

It is thus the object of the present invention to provide a compact RFID transponder which is as completely planar as possible, which is technically easy to reproduce and which allows (with a preset antenna volume) a range which is as high as possible and a power adaptation which is as good as possible.

This object is solved by an RFID transponder and by a corresponding manufacturing method.

The present invention will now first be described generally in the following and then with reference to individual embodiments. The individual features of the present invention realized in the advantageous embodiments in combination with one another in this respect do not have to be realized in the specific combinations shown in the examples within the framework of the invention (whose protective scope is defined by the enclosed claims), but can also be realized in other combinations within the framework of the present invention. In other words, the advantageous features shown in combination in the examples can also be realized independently of one another.

Like every RFID transponder, the RFID transponder in accordance with the invention has an antenna and a chip which includes at least one transmitter and receiver circuit as well as a memory and which is electrically connected to the antenna. The RFID transponder in accordance with the invention can in this respect, as the skilled person is aware, be realized as a passive, semi-passive or active RFID transponder.

An essential aspect of the present invention is the combination of an antenna and an adaptation network which is integrated into the antenna structure. The adaptation network adapts the input impedance of the antenna to the impedance of the chip used in a conjugate complex manner. The antenna is an antenna having at least one winding; in particular a loop antenna can be used advantageously which, as the skilled person is aware, consists of or comprises an (almost completely) closed electric conductor loop.

The RFID transponder in accordance with the invention thus includes the antenna and a chip which includes at least one transmitter and receiver circuit as well as a memory and which is electrically connected to the antenna to carry out the transmission and reception processes familiar to the skilled person. The RFID transponder in accordance with the invention furthermore has a dielectric carrier element which is covered on a first surface (alternatively also called an upper side in the following) at least sectionally with a structured first metallization (e.g. a metal layer) and which is covered on a second surface (alternatively also called a lower side in the following) disposed opposite to this first surface at least sectionally with a second metallization (e.g. likewise a metal layer). The dielectric carrier element can be a parallelepiped, flat plate (flat in this connection means that the height of the plate or the spacing between the first surface and the second surface is much smaller than the extents perpendicular hereto or than the width and/or the length of the dielectric carrier element).

The antenna of the RFID transponder is formed by an electrically conductive connection of the first metallization and of the second metallization with one another within the framework of the present invention. This is done, as described in more detail in the following, for example, by through holes in the dielectric carrier element which extend from the first surface to the second surface and which are then filled (for example galvanically) by a conductive material (in particular metal). The filled through holes then establish a conductive connection between the first metallization and the second metallization so that the through hole fillings and the two metallizations form the antenna.

The structuring of the first metallization on the first surface is made in this respect so that two electrically mutually insulated, electrically conductive terminals are formed (for example, by provision of a cut-out and/or break) on the first surface, via which terminals the antenna can be electrically contacted or electrically connected to the chip. The chip can be aligned suitably on the first surface of the dielectric carrier element for the carrying out of such an electrical connection and can be fixedly bonded in the desired position in electric contact with the two terminals. It is also possible, for example to provide a recess for the chip in the first surface into which the chip can then be placed and can be brought into electric contact with the two terminals.

Finally, the first metallization formed on the first surface is in a further aspect also structured in the present invention such that it forms at least one part or one section (for example a capacitance section) of an adaptation network by means of which the input impedance of the antenna can be adapted to the impedance of the chip in a conjugate complex manner.

This adaptation network preferably has at least two capacitances, with at least one of these capacitances, in a particularly preferred case also both capacitances, being formed by the structuring of the first metallization on the first surface. The capacitance/capacitances formed by structuring of the first metallization can in this respect be made as slot-shaped, air-filled (optionally also filled with a dielectric material) cut-outs or breaks in the first metallization. Such cut-outs or breaks can be manufactured by subsequent processing of a metal layer completely covering the first surface; it is, however, also possible already to provide the first metallization with a corresponding structure on manufacture. Such capacitances made in slot shape (or the metallization sections or their oppositely disposed end-face ends at either side of such a slot) are particularly preferably arranged parallel or perpendicular to a longitudinal axis of a dielectric carrier element of parallelepiped shape.

In a particularly preferred embodiment, the adaptation network includes a first capacitance (also called $C_{ser}$ in the following) which is connected in series to the chip arranged on the first surface and a second capacitance (also called $C_{shunt}$ in the following) which is then connected in parallel to this serial connection of chip and first capacitance. This parallel circuit is then connected to the two terminals of the antenna or to the antenna.

As will be described in detail in the following, one of the two capacitances or both capacitances can be made (in particular on formation by corresponding slots) as distributed capacitance(s) and/or as interdigital capacitors. A capacitance is understood as a distributed capacitance which has an extent (that is a length, width or height, in particular a length, width and height) which is larger than a quarter of the wavelength to which the RFID transponder is adapted (that is, for example, a wavelength corresponding to the UHF band 865-868 MHz). The extent can in particular be a whole-number multiple of this quarter wavelength. A capacitor is understood as an interdigital capacitor which includes a plurality of parallel, mutually engaging conductors.

Alternatively to this, however, it is also possible to form one of the capacitances (or also both capacitances) as concentrated capacitance(s), with a capacitance being understood by such a capacitance whose spatial dimensions are negligibly small with respect to the operating wavelength which therefore has an extent (see above) which is smaller than a quarter of the aforesaid wavelength by at least the factor of five, preferably by at least the factor of 10, preferably by at least the factor of 25. Such a distributed capacitance can in particular be an SMD capacitor.

As will be described in even more detail in the following, the materials and the geometries in the present invention are selected such that $$\frac{\lambda_0}{8\sqrt{\varepsilon_{r\_eff}}} \leq L \leq \frac{3\lambda_0}{4\sqrt{\varepsilon_{r\_eff}}}$$

applies, where $\varepsilon_{r\_eff}$ is the effective permittivity of the material of the dielectric carrier element and L the total length of the antenna (the total length includes, for example with a loop antenna, the length of the two metallizations in the longitudinal direction of the dielectric carrier element as well as the extent of two leadthroughs through the dielectric carrier element which are formed at the respectively oppositely disposed ends, viewed in the longitudinal direction).

The wavelength $\lambda$ on the microstrip conductor is shortened by the factor $\sqrt{\varepsilon_{r\_eff}} = c_0/v_{ph} = \lambda_0/\lambda$ with respect to the free space $\lambda_0$ wavelength; $\varepsilon_{r\_eff}$ is smaller than $\varepsilon_r$ of the substrate material so that the field not only in the substrate, but partly also in air. This definition of the effective permittivity number $\varepsilon_{r\_eff}$ means that the wave on the line with a coated dielectric propagates at the same phase speed as a TEM wave in a homogeneous dielectric with the permittivity number $\varepsilon_{r\_eff}$ (cf. O. Zinke, H. Brunswig. Hochfrequenztechnik 1 [Hochfrequenztechnik 1, Springer-Verlag, 6th Edition, p. 159).

$\lambda_0$ in this respect is a predetermined wavelength, preferably a wavelength from one of the three aforesaid UHF bands.

As already described, the first metallization and the second metallization can be electrically conductively connected via two leadthroughs which are filled with an electrically conductive material and which extend from the upper side to the lower side of the dielectric carrier element. Alternatively to this, however, it is also possible to cover two oppositely disposed end faces of the dielectric carrier element extending perpendicular to the first surface and to the second surface (preferably the oppositely disposed end faces viewed in the direction of the longitudinal axis of a parallelepiped-shaped dielectric carrier element) with a metallization which then electrically connects the first metallization to the second metallization at both ends of the dielectric carrier element.

A loop antenna (formed by the first metallization and second metallization and by their electrically conductive connections) is particularly preferably used within the framework of the present invention. It is, however, generally also conceivable to provide a plurality of windings, offset to one another, in a corresponding manner on the dielectric carrier element (by a suitable structuring of the first metallization and of the second metallization) and to connect the adaptation network and the chip to these windings as described above.

BRIEF DESCRIPTION OF THE DRAWINGS

The present invention will now be described in more detail with reference to embodiments and to drawings.

There are shown

DETAILED DESCRIPTION OF THE PREFERRED EMBODIMENTS

Figure 1:
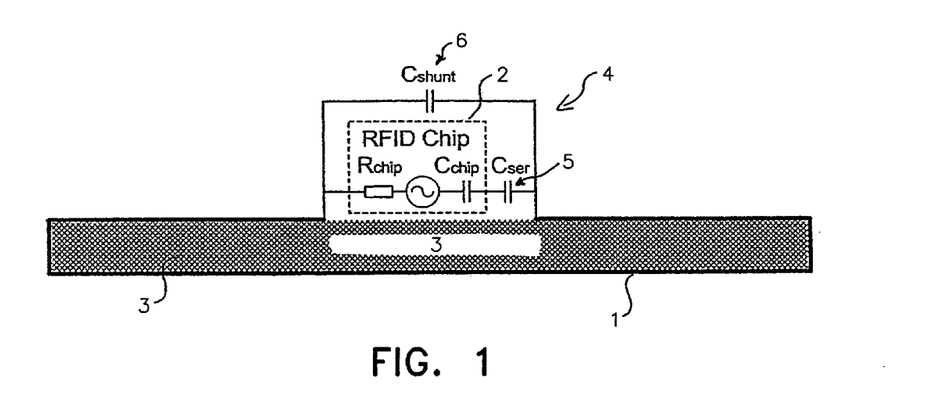
FIG. 1 a schematic representation of an RFID transponder in accordance with the invention having a tag loop antenna and having adaptation elements.

FIG. 1 outlines the general design of an RFID transponder in accordance with the invention. The first metallization and the second metallization together with the electrical contacts between these elements, which form the loop antenna, are only shown schematically here; as is the dielectric carrier element 3 carrying the antenna 1. The electric terminals A1, A2 (cf. FIG. 3) formed by two metallization ends of the first metallization on the upper side of the dielectric carrier element are connected to a parallel circuit comprising the chip 2 and a first capacitance 5 connected thereto in series, on the one hand, and to a second capacitance 6 connected in parallel to this serial connection, on the other hand.

As is outlined in the Figure, the chip 2 can be considered in simplified terms as a serial connection of an Ohmic resistance R, of a voltage source and of a capacitance C.

Specifically, an Alien-H3 chip of the company Alien technology Corp. was used here which is made for use in the frequency range from 860 to 960 MHz. The chip is relatively low ohmic (input resistance $R_{chip}$=27 Ohms) and of a very high capacitance (input capacitance $C_{chip}$=0.87 pF). As will still be described in the following, the input impedance of the antenna 1 is adapted in a conjugate complex manner to the impedance of the chip 2 by the shown adaptation network with a suitable choice of its parameters so that a maximum antenna gain and thus a maximum reach are achieved.

Since the loop antenna has an inductive impedance with the provided relatively small dimensions (the length of the loop antenna or the length of the dielectric carrier element in the longitudinal direction (cf. FIG. 3) is considerably shorter than half the wavelength in the above-named frequency range), that is, the outer dimensions of the RFID transponder are limited, the antenna is not long enough to compensate the capacitance of the chip.

The antenna 1 is therefore adapted in a conjugate complex manner to the two capacitances 5 and 6 as described above. The capacitance 6 (concentrated capacitance) can be a so-called SMD (surface mount device) capacitor; the capacitance can be realized (interdigitally) as a layer capacitance. This in particular has the advantage that the tag is then completely planar and is easily reproducible. A layer capacitance or an interdigital compensator in this respect preferably includes a plurality of conductor sections engaging into one another in parallel.

It is also possible within the framework of the invention to adapt the transponder over a broad band (for operation in a plurality of frequency bands or in all frequency bands 865 to 868 MHz, 902 to 928 MHz and 950 to 956 MHz. For this purpose, then only the capacitance $C_{shunt}$, but not the capacitance $C_{ser}$, is required. However, quite so good a power adaptation is no longer possible. The VSWR value (standing wave ratio) for a tag formed in this way is between 9 and 45.

The following designs are possible for a transponder having the dimensions (without housing) 37×7×3.3 mm$^3$: Range [m] Europe/USA and Canada/Japan:

2.5/1.6/1.1
2.0/2.0/1.3
1.6/2.5/1.6.

Figure 2:
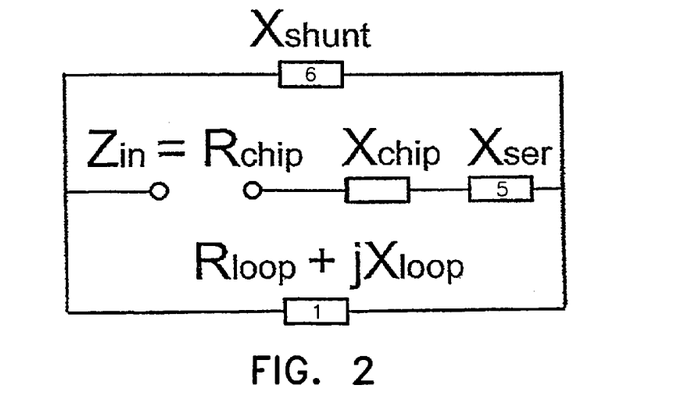
FIG. 2 an equivalent circuit diagram of an RFID transponder in accordance with the invention with adaptation elements.

This adaptation network 4 is thus formed in the present case from the two shown capacitances 5, 6 in the shown circuit with the chip 2 and the antenna 1 (see also FIG. 2: equivalent circuit diagram).

Figure 3:
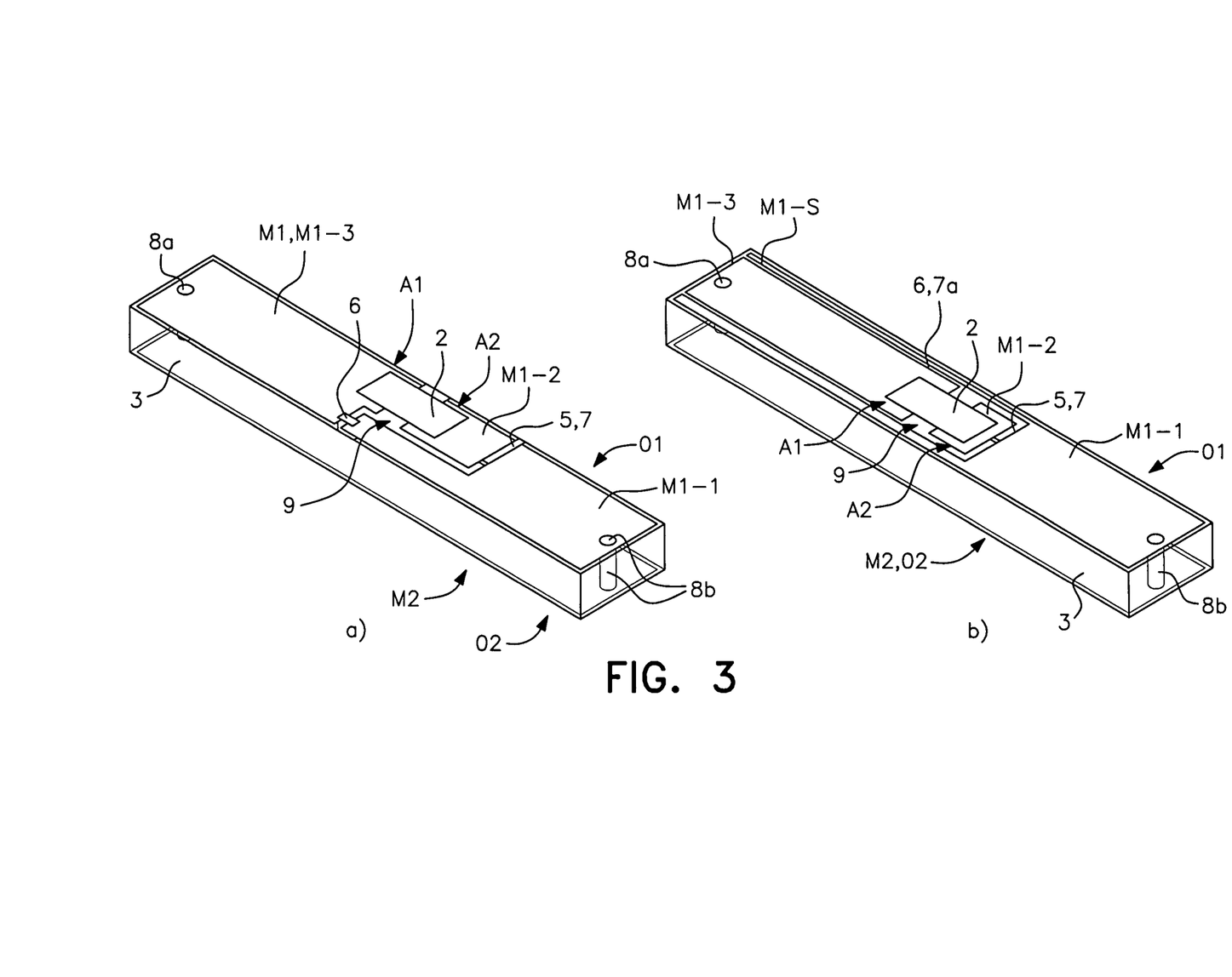
FIG. 3 an RFID transponder in accordance with the invention with a concentrated capacitance and a distributed capacitance and a further RFID transponder in accordance with the invention with two distributed capacitances.

FIG. 3 now shows two specific embodiments for a realization of the design shown in FIG. 1: Both embodiments use a parallelepiped-shaped dielectric carrier element 3, whose height (spacing between the upper side O1 and the lower side O2 of the carrier element shown) here amounts to approximately 3 mm (drawn in exaggerated form) and whose length here amounts to approximately 37 mm (dimensions without housing).

The dielectric carrier element 3 is provided with a structured first metallization M1 on the upper side O1. The dielectric carrier element 3 is provided on the lower side O2 disposed opposite the upper side O1 with a second metallization M2 which is not structured here and which completely covers the lower side of the dielectric carrier element 3. Openings (throughholes) which are galvanically filled with a metal and which pass completely through the carrier element 3 seen in the direction from the upper side O1 to the lower side O2 are present in the carrier element 3 close to the two oppositely disposed end faces, seen in the longitudinal direction. These two metal-filled through holes 8a, 8b are made such that they electrically conductively connect the first metallization M1 and the second metallization M2 at the two oppositely disposed (seen in the longitudinal direction) ends. The first metallization M1, the second metallization M2 and the two metal-filled through holes 8a, 8b thus form the antenna 1 in the present case. The through holes or through-connections 8a, 8b are selected to be (inductively) as thin as possible and are positioned as close as possible to the short edges of the carrier element 3 (so that the total length of the loop is at a maximum).

The first metallization layer M1 formed on the upper side O1 of the carrier element 3 is now structured in the first embodiment of the RFID transponder in accordance with the invention shown (at the left) in FIG. 3a such that it forms the two electrical terminals A1 and A2 with which the chip 2 electrically contacts the antenna 1 and such that it forms the first capacitance $C_{ser}$ 5 connected in series with the chip 2. The metal layer M1 for this purpose has a thin, slot-shaped break 7. The metal layer M1 is thus completely removed from the upper side O1 of the carrier element 3 in the region of this electrical break. A section of this narrow, slot-shaped break 7 extends perpendicular to the longitudinal direction, that is in the width direction on the surface O1 and divides, seen from the through hole 8b toward the through hole 8a, the metallization M1 into a first metallization section M1-1 and a second central metallization section M1-2.

There is then present, seen in the same direction, a further electrical break 9, the break for the chip 2, which has approximately three times the width (seen in the longitudinal direction) as the slot-shaped interruption 7 between the first and second metallization sections M1-1 and M1-2 of the first metallization M1. This further, wider break 9 provided for the chip 2 thus likewise divides the first metallization M1 into two sections and separates the second, central metallization section M1-2 from the third metallization section M1-3 which is then electrically conductively connected to the leadthrough 8a. The first metallization section M1-1 is electrically conductively connected to the leadthrough 8b. The two breaks 7, 9 thus divide the metallization M1 along the longitudinal direction into the three sections M1-1 to M1-3 electrically insulated from one another.

The chip 2 is arranged on the first surface O1 such that the first electrical chip terminal is electrically conductively connected to the third metallization section M1-3 and, at the other side of the chip break 9, the second electrical chip terminal is electrically conductively connected to the second, center metallization section M1-2. The narrow, slot-shaped trench section 7 between the second metallization section M1-2 and the first metallization section M1-1 forms the first capacitance $C_{ser}$ 5 extending perpendicular to the longitudinal direction of the carrier element 3.

In the present case, parallel to the division into three sections M1-1 to M1-3 described above, a further slot-shaped trench section is realized between the metallization section M1-3 and the metallization section M1-1, above which the second capacitance $C_{shunt}$ 6 is arranged and electrically connected to the two metallization sections M1-3 and M1-1 so that the parallel circuit shown in FIG. 1 is realized by a suitable continuation of the trench 7 initially parallel to the longitudinal axial direction (that is in the direction from the second through hole 8b toward the first break 8a) and then again seen perpendicular to the longitudinal axial direction of the carrier element 3 (so that the slot-shaped trench section 7 together with its continuation and together with the wider chip break divides the first metallization M1 into the three above-described surface sections M1-1 to M1-3 electrically completely insulated from one another).

FIG. 3b shows a second embodiment for an RFID transponder in accordance with the invention which is generally equally realized like the embodiment shown in FIG. 3a. Only the differences will therefore be described in the following.

Whereas in the case shown in FIG. 3a, a distributed first capacitance 5 and a concentrated, second capacitance 6 are formed, in the case shown in FIG. 3b not only the first capacitance 5 is formed (by means of a slot-shaped trench section) in a distributed manner, but also the second capacitance 6. For this purpose, the first metallization M1 has a further slot-shaped trench section, which is provided with the reference numeral 7a here, which extends in the longitudinal direction of the carrier element 3 and which is connected to the transversely extending trench section 7 (which forms the first capacitance 5). This trench section 7a extends, seen in the longitudinal section, from the side of the chip facing the second through hole 8b over the chip 2 up to the side of the chip facing the first through hole 8a and furthermore such that the first metallization section M1-1 of the first metallization M1 has a narrow, web-shaped section M1-S at the longitudinal side margin of the dielectric carrier element (or at the side next to the chip 2) which forms the second capacitance 6 together with the third metallization section M1-3 of the first metallization M1 disposed opposite seen in the transverse direction.

In the case shown in FIG. 3b, the structuring of the metallization M1 or of the three sections thereof (M1-1 to M1-3) is thus formed with the help of the slot-shaped trench sections 7, 7a so that both capacitances 5, 6 are realized as distributed capacitances.

As FIG. 3 shows, the capacitances 5, 6 can be realized both by means of concentrated components (that is components whose extent is very small in comparison with the quarter wavelength) and by means of distributed elements. Each of the two antennas 1 of a transponder in accordance with the invention presented in FIG. 3 comprises a dielectric carrier material (RF substrate) 3 which is metallized on both sides.

The upper side O1 of the carrier element 3 has a break 9 for the chip 2 and is galvanically connected to the lower side by means of through-connections 8a, 8b. The adaptation of the antenna 1 in FIG. 3a takes place by capacitive coupling (capacitance 5) and a capacitor (capacitance 6) which is embedded into the conductor plate or the metallization layer M1.

The shorter the RFID transponder is, the more sensitive it is with respect to scatterings of the capacitance of the capacitor 6—the reproducibility in the case shown in FIG. 3a is therefore more difficult than in the case shown in FIG. 3b. The antenna 1 of the embodiment of FIG. 3b, unlike the antenna 1 in FIG. 3a, has no concentrated adaptation elements. A technically easily reproducible adaptation takes place through the two slots 7, 7a.

The specific size of the capacitances 5, 6, which are required for the conjugate complex adaptation of the input impedance of the antenna to the impedance of the chip, can be set as follows:

FIG. 2 first shows the equivalent circuit diagram of the arrangements shown in FIGS. 1 to 3 which is based on the following considerations (input impedance of the circuit; Z is the impedance, R is the active resistance and X is the reactance: "in" relates to the input impedance of the circuit; "shunt" to the capacitance 6; "chip" to the chip 2; and "loop" to the above-described loop antenna 1).

It thus follows $$Z_{in} = jX_{chip} + jX_{ser} + \frac{jX_{shunt}(R_{loop} + jX_{loop})}{jX_{shunt} + (R_{loop} + jX_{shunt})}$$

or $$Z_{in} = R_{in} + jX_{in}$$

where $$R_{in} = \frac{R_{loop} X_{shunt}^2}{R_{loop}^2 + (X_{loop} + X_{shunt})^2}$$

$$X_{in} = X_{chip} + X_{ser} + \frac{X_{shunt}(R_{loop}^2 + X_{loop}^2 + X_{loop} X_{shunt})}{R_{loop}^2 + (X_{loop} + X_{shunt})^2}$$

The condition of the conjugate complex power adaptation is:

$$\begin{cases} R_{in} = R_{chip} \\ X_{in} = 0 \end{cases}$$

It results from this $$X_{shunt} = \frac{R_{chip} X_{loop} + \sqrt{R_{chip}^2 X_{loop}^2 + R_{chip}(R_{loop} - R_{chip})(R_{loop}^2 + X_{chip}^2)}}{R_{loop} - R_{chip}}$$

$$X_{ser} = -X_{chip} - X_{shunt} \frac{R_{loop}^2 + X_{loop}^2 + X_{loop} X_{shunt}}{R_{loop}^2 + (X_{loop} + X_{shunt})^2}$$

and thus $$C_{shunt} = -\frac{1}{2\pi f_0 X_{shunt}} \text{ and}$$

$$C_{ser} = -\frac{1}{2\pi f_0 X_{ser}}.$$

Where $f_0$ is the resonance frequency, that is, that frequency to which the RFID transponder is adapted.

The slots 7, 7a can also be dimensioned with respect to their width and length with reference to the capacitance values of the capacitances 5, 6. The capacitance of such a slot is proportional to the slot length and inversely proportional to the slot width.

Figure 4:
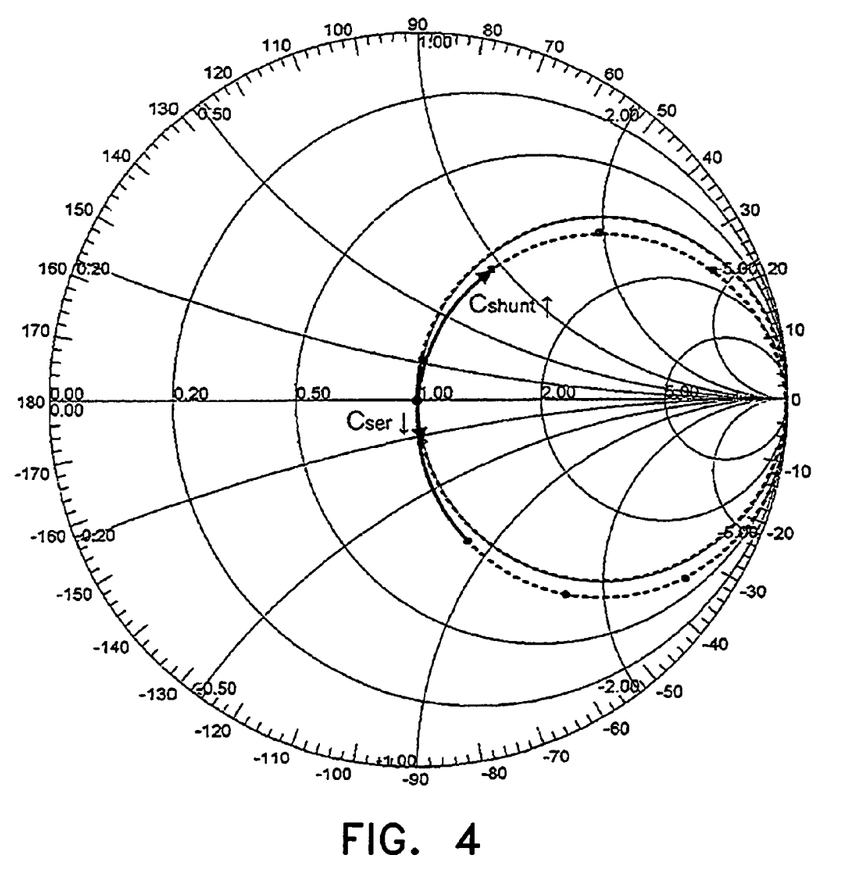
FIG. 4 the adaptation of a loop antenna of an RFID transponder in accordance with the invention.

FIG. 4 shows the influence of the capacitances $C_{shunt}$ 6 and $C_{ser}$ 5 on the input impedance of the antenna as a Smith diagram. The active resistance $R_{in}$ of the adaptation network 4 shown is determined by the capacitance $C_{shunt}$ 6; the remaining positive reactance $X_{in}$ is compensated by the capacitance $C_{ser}$ 5.

The following condition particularly preferably has to be satisfied for the optimization of the range with a simultaneously good power adaptation:

$$\frac{\lambda_0}{8\sqrt{\varepsilon_{r\_eff}}} \leq L \leq \frac{3\lambda_0}{4\sqrt{\varepsilon_{r\_eff}}}$$

Where L is the total length of the antenna loop 1, $\lambda_0$ is the wavelength at the resonant frequency $f_0$ (C=$\lambda_0 * f_0$) and $\varepsilon_{r\_eff}$ is the effective permittivity of the material of the dielectric carrier element 3. The shorter the total length L of the loop antenna 1 is, the larger the capacitance $C_{shunt}$ 6 has to be and the smaller the capacitance $C_{ser}$ 5 becomes. The width and the height of the loop antenna (that is ultimately the embodiment of shape and size of the metallizations M1, M2 and of the carrier element 3) determine the efficiency of the antenna 1. The wider the loop antenna is and the higher its total length L is, the more efficient the loop antenna is.

Figure 5:
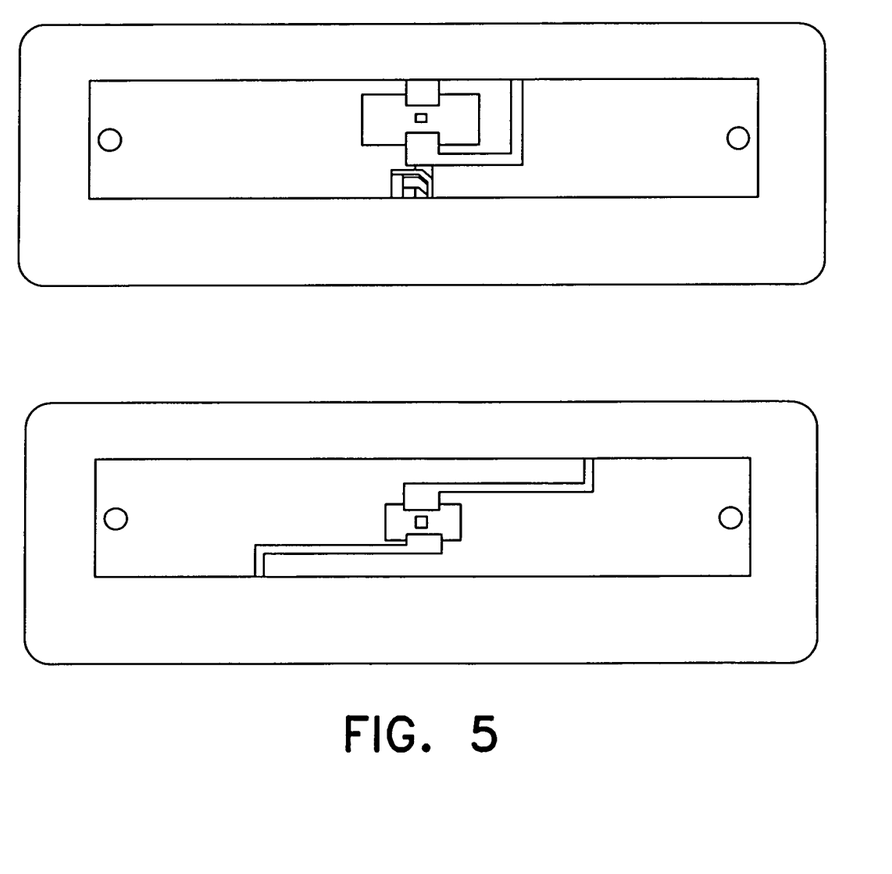
FIG. 5 the image of an RFID transponder in accordance with the invention.

FIG. 5 shows a specific embodiment of an RFID transponder in accordance with the invention for 865 to 868 MHz in Europe. The chip 2 is bonded to the antenna 1 with the help of a conductive adhesive, as shown in FIG. 3. The dimensions without housing amount in the case shown to 37×7×3.3 mm³. With the housing, the dimensions amount to 45×15×5 mm³ (the substrate is a dielectric with $\in_r$ =3.38 and with tan δ=0.0027; tan δ is the loss factor of the dielectric). The housing is made from polycarbonate.

Figure 6:
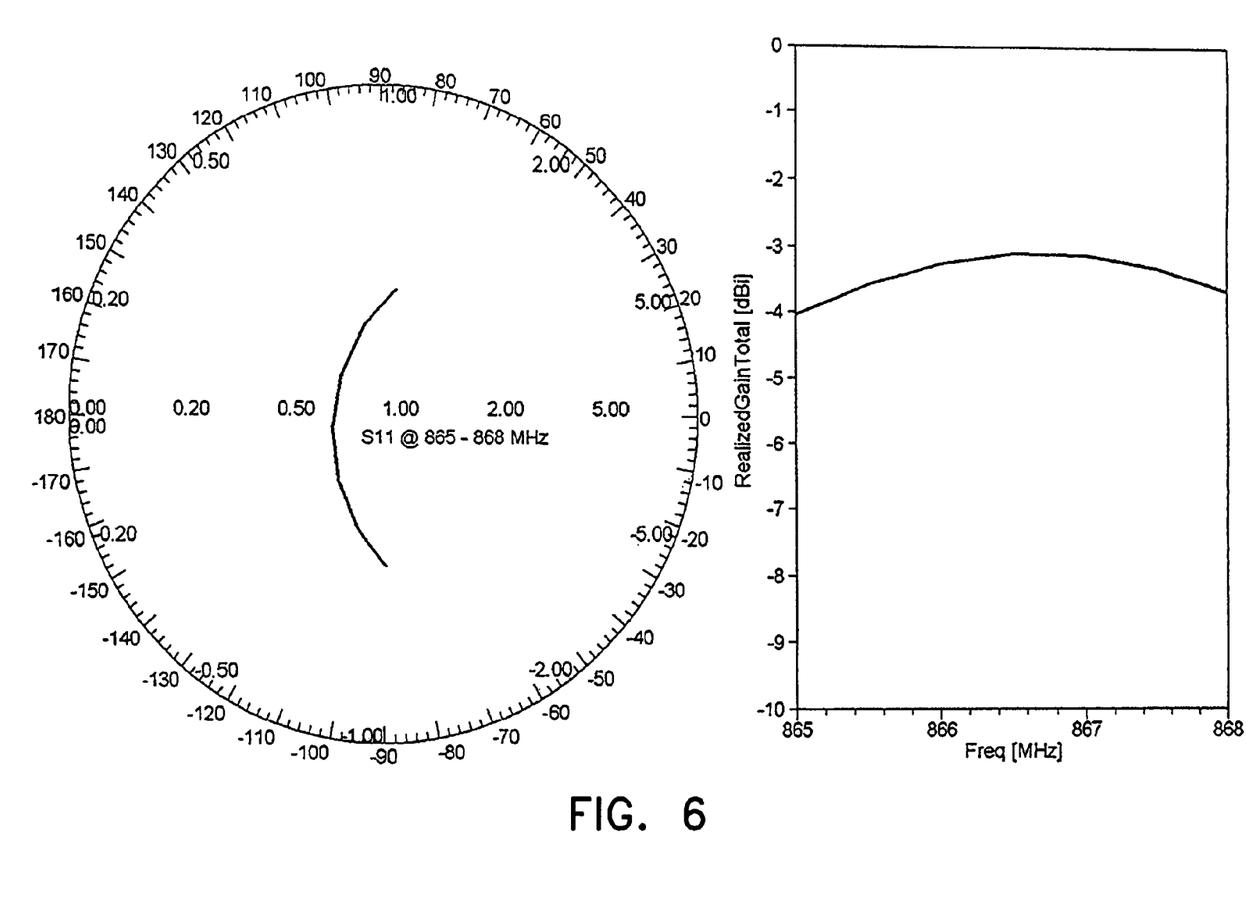
FIG. 6 the extent of the reflection coefficient and the extent of the antenna gain with an RFID transponder in accordance with the invention.
Figure 7:
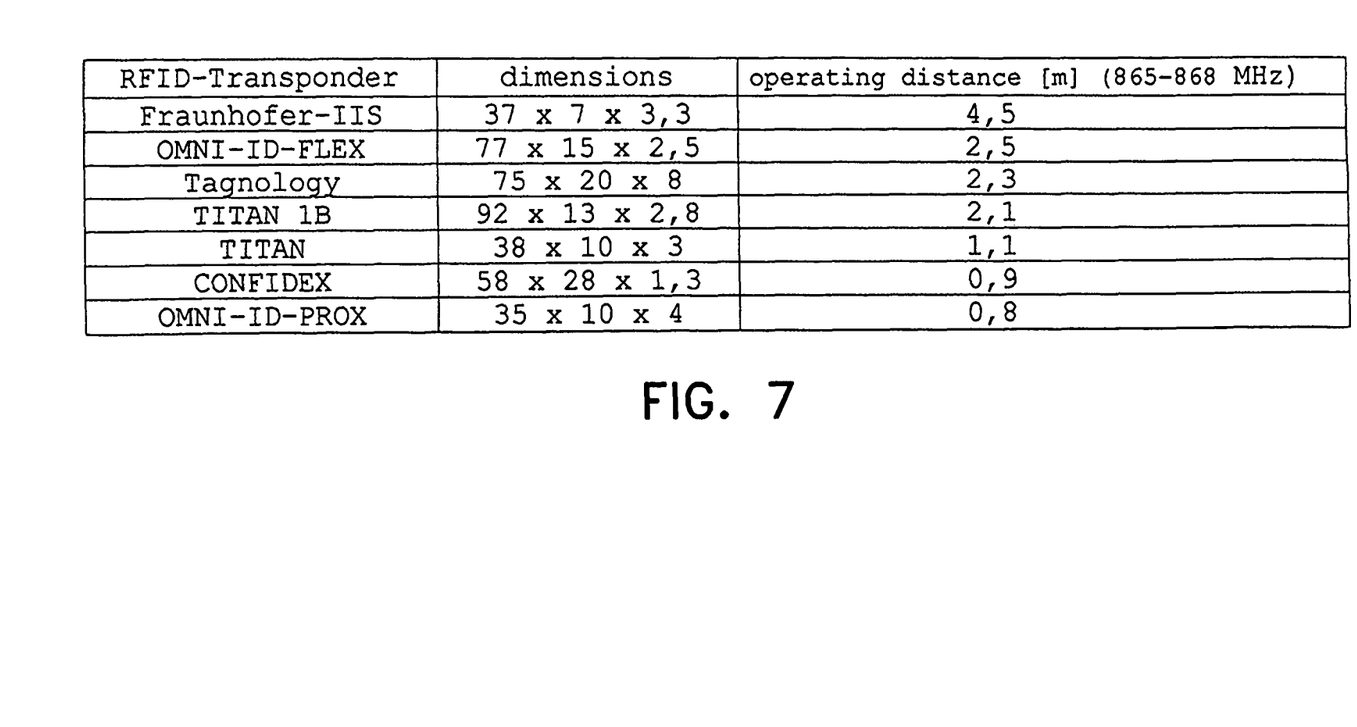
FIG. 7 measurement results at an RFID transponder in accordance with the invention in comparison with other transponders from the prior art.

FIG. 6, left, shows the reflection coefficient S11 of the RFID transponder shown in FIG. 5. The diameter of the impedance curve is relatively large even with a relative bandwidth of approximately 0.3% and indicates narrow band and sensitivity of the antenna 1 in accordance with the invention. The antenna gain is approximately −3.5 dBi despite a low efficiency of only approximately 17% (cf. FIG. 6 at the right), which corresponds to a range of up to 5 m (at 2 W transmission power). The measurements carried out also confirm this whose results are summarized in FIG. 7 (RFID transponder in accordance with the invention in the second line in comparison with other transponders from the prior art; Reader: Sirit, output power: 27 dBm; gain of the transmission antenna 6 dBi; metal plate: 250×1000 mm²).

The present invention in particular has the advantage of a completely planar and relatively small design of the antenna 1 and/or of the RFID transponder which is inexpensive to realize. The transponder can in this respect advantageously be used for operation on metal; it is, however, also possible to use the transponder for operation on non-conductive surfaces. The antenna 1 can be realized with a simple topology (rectangular terminals A1, A2 and rectangular slots or capacitances). The RFID transponder in accordance with the invention can be optimized to the frequency band to be used in a simple manner. With fixed external dimensions (of the carrier element), only slot lengths and widths have to be adjusted (see above-described calculations). The same applies when another chip 2 should be used or when the antenna 1 should be adapted for a different frequency range.

The invention claimed is:
1. An RFID transponder comprising:
an antenna;
a chip comprising at least one transmission and reception circuit as well as a memory;
a dielectric carrier element which is covered on a first surface at least sectionally with a structured first metallization and which is covered on a second surface disposed opposite the first surface at least sectionally with a second metallization;
the first and second metallizations being jointly electrically conductively connected, thereby forming the antenna, the first metallization being structured such that it forms two electric terminals of the antenna arranged on the first surface of the dielectric carrier element, and the chip can be or is electrically contacted via these two terminals and is positionable or is arranged on the first surface and/or is positionable or is arranged at least sectionally integrated into this surface; and an adaptation network at least partly formed by the structuring of the first metallization and adapting the input impedance of the antenna in a conjugate complex manner to the impedance of the chip, the adaptation network having a first capacitance $C_{ser}$ which is connected in series to the chip and a second capacitance $C_{shunt}$ which is connected in parallel to this series connection of the chip and the first capacitance $C_{ser}$.

2. The RFID transponder in accordance with claim 1, wherein the adaptation network includes at least one capacitance with the capacitance formed by the structuring of the first metallization.

3. The RFID transponder in accordance with claim 2, wherein at least one of the capacitances formed by the structuring of the first metallization is/are formed by a slot-shaped cut-out or break in the first metallization extending parallel or perpendicular to a longitudinal axis of the dielectric carrier element made in parallelepiped shape.

4. The RFID transponder in accordance with claim 1, wherein the adaptation network has at least one capacitance which is made as a capacitance with a length, width and/or height which is smaller by at least the factor of five than a quarter of the smallest wavelength of a predetermined frequency band from at least one of the three UHF bands 865 to 868 MHz, 902 to 928 MHz and 950 to 956 MHz.

5. The RFID transponder in accordance with claim 1, wherein the adaptation network has at least one capacitance which is/are made as an interdigital capacitor, with a length, width and/or height which is/are larger or which is/are smaller than a quarter of the smallest wavelength of a predetermined frequency band from at least one of the three UHF bands 865 to 868 MHz, 902 to 928 MHz and 950 to 956 MHz.

6. The RFID transponder in accordance with claim 1, wherein the dielectric carrier element and the antenna are made such that $$\frac{\lambda_0}{8\sqrt{\varepsilon_{r\_eff}}} \leq L \leq \frac{3\lambda_0}{4\sqrt{\varepsilon_{r\_eff}}}$$

applies with $\in_{r\_eff}$ as the effective permittivity of the material of the dielectric carrier element, with L as the total length of the antenna and with $\lambda_0$ as a predetermined wavelength from one of the three UHF bands 865 to 868 MHz, 902 to 928 MHz and 950 to 956 MHz.

7. The RFID transponder in accordance with claim 1, wherein the first and second metallizations are electrically conductively connected via at least one leadthrough in the dielectric carrier element galvanically filled, with an electrically conductive material and/or via at least one line section led at the outside at the dielectric carrier element.

8. The RFID transponder in accordance with claim 1, wherein the antenna includes at least one winding or loop, and/or is made as a loop antenna.

9. The RFID transponder in accordance with claim 1, wherein the dielectric carrier element is made in parallelepiped form and/or with a spacing between the first and second surfaces of between 2000 and 7000 μm and/or contains or consists of a conductor plate material;

and/or in that the first and/or the second metallization cover(s) the dielectric carrier element with a thickness of between 10 and 100 μm and/or contain(s) consist(s) of Cu and/or Ag.

10. The RFID communications system having an RFID transponder in accordance with claim 1 and having an RFID reader, wherein an electromagnetic alternating field is generated with the RFID reader in at least one of the frequency intervals 865 to 868 MHz, 902 to 928 MHz and/or 950 to 956 MHz; and in that the structuring, arrangement and/or formation of the antenna, of the dielectric carrier element and/or of the chip is adapted to this at at least one frequency interval.

11. A manufacturing method for an RFID transponder comprising:

providing an antenna;

providing a chip comprising at least one transmission and reception circuit as well as a memory;

disposing the at least sectional covering of a first surface of a dielectric carrier element with a first metallization and the at least sectional covering of a second surface of the dielectric carrier element opposite the first surface with a second metallization;

arranging the electrically conductive mutual connection of the first and second metallizations and the forming thereby of the antenna and the structuring of the first metallization such that it forms two electrical terminals of the antenna arranged on the first surface of the dielectric carrier element;

arranging the electric contacting of the chip via these two terminals and the chip on the first surface and/or the at least sectional integrating of the chip into this surface; and structuring the formation carried out at least partly by the first metallization of an adaptation network such that the input impedance of the antenna is adapted in a conjugate complex manner to the impedance of the chip, the adaptation network having a first capacitance $C_{ser}$ which is connected in series to the chip and a second capacitance $C_{shunt}$ which is connected parallel to this series connection of the chip and first capacitance $C_{ser}$, wherein an RFID transponder in accordance with claim 1 is manufactured.

12. A manufacturing method for an RFID transponder comprising:

providing an antenna;

providing a chip comprising at least one transmission and reception circuit as well as a memory;

disposing the at least sectional covering of a first surface of a dielectric carrier element with a first metallization and the at least sectional covering of a second surface of the dielectric carrier element opposite the first surface with a second metallization;

arranging the electrically conductive mutual connection of the first and second metallizations and the forming thereby of the antenna and the structuring of the first metallization such that it forms two electrical terminals of the antenna on the first surface of the dielectric carrier element;

arranging the electric contacting of the chip via these two terminals and the chip on the first surface and/or the at least sectional integrating of the chip into this surface; and structuring the formation carried out at least partly by the first metallization of an adaptation network such that the input impedance of the antenna is adapted in a conjugate complex manner to the impedance of the chip, the adaptation network having a first capacitance $C_{ser}$ which is connected in series to the chip and a second capacitance $C_{shunt}$ which is connected in parallel to this series connection of the chip and first capacitance $C_{ser}$.

13. An RFID transponder comprising:

an antenna;

a chip comprising at least one transmission and reception circuit as well as a memory;

a dielectric carrier element which is covered on a first surface at least sectionally with a structured first metallization and which is covered on a second surface disposed opposite the first surface at least sectionally with a second metallization;

the first and second metallizations being jointly electrically conductively connected, thereby forming the antenna, the first metallization being structured such that it forms two electric terminals of the antenna arranged on the first surface of the dielectric carrier element, and the chip can be or is electrically contacted via these two terminals and is positionable or is arranged on the first surface and/or is positionable or is arranged at least sectionally integrated into this surface; and an adaptation network at least partly formed by the structuring of the first metallization and adapting the input impedance of the antenna in a conjugate complex manner to the impedance of the chip, the dielectric carrier element and the antenna being made such that $$\frac{\lambda_0}{8\sqrt{\varepsilon_{r\_eff}}} \le L \le \frac{3\lambda_0}{4\sqrt{\varepsilon_{r\_eff}}}$$

applies with $\varepsilon_{r\_eff}$ as the effective permittivity of the material of the dielectric carrier element, with L as the total length of the antenna and with $\lambda_0$ as a predetermined wavelength from one of the three UHF bands 865 to 868 MHz, 902 to 928 MHz and 950 to 956 MHz.

* * * * *